United States Patent [19]
Coleman

[11] Patent Number: 6,050,597
[45] Date of Patent: *Apr. 18, 2000

[54] HORN SWITCH FOR AIR BAG MODULE

[75] Inventor: Daniel E. Coleman, Mesa, Ariz.

[73] Assignee: TRW Inc., Lyndhurst, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/810,580

[22] Filed: Mar. 4, 1997

[51] Int. Cl.[7] ................................................... B60R 21/16
[52] U.S. Cl. .................... 280/731; 280/728.3; 200/61.54
[58] Field of Search .............................. 280/728.2, 728.3, 280/731; 200/61.54–61.57

[56] References Cited

U.S. PATENT DOCUMENTS

| | | |
|---|---|---|
| 5,157,372 | 10/1992 | Langford . |
| 5,284,359 | 2/1994 | Baba ................................... 280/728.3 |
| 5,309,135 | 5/1994 | Langford . |
| 5,338,059 | 8/1994 | Inoue et al. .............................. 280/731 |
| 5,465,998 | 11/1995 | Davis . |
| 5,577,767 | 11/1996 | Nemoto ................................... 280/731 |
| 5,658,008 | 8/1997 | Herrmann et al. .................... 280/728.2 |
| 5,685,560 | 11/1997 | Sugiyama et al. ...................... 280/731 |

FOREIGN PATENT DOCUMENTS

| | | |
|---|---|---|
| 0756973 | 2/1997 | European Pat. Off. . |
| 19522313 | 1/1996 | Germany . |

*Primary Examiner*—Paul N. Dickson
*Attorney, Agent, or Firm*—Tarolli, Sundheim, Covell, Tummino & Szabo L.L.P.

[57] ABSTRACT

An air bag module (10) includes an inflatable device (40) and an inflator (30) for inflating the inflatable device. Support (20, 24) supports the inflator (30) and the inflatable device (40) on a portion of the vehicle (12). A cover (70) covers the inflatable device and the inflator. A structure (100) is disposed between the cover and the inflatable device and in an electric circuit (130, 132, 134) for actuating an electrically actuatable device (102) of the vehicle. The cover has a first portion (72) engageable by the vehicle occupant to actuate the electrically actuatable device and a second portion (84) for connecting the first portion with the support. The first portion of the cover is movable, due to the force of inflation of the inflatable device, from a closed condition to an open condition to enable inflation of the inflatable device. The structure has an active portion (122) underlying the first portion of the cover. The active portion of the structure comprises an electrically conductive material (110) having an electrical resistance which is variable in response to force applied to the cover by a vehicle occupant to deform the cover. The structure has an inactive portion (124) underlying the second portion of the cover. Fastener (90) connects the inactive portion of the structure with the second portion of the cover.

15 Claims, 4 Drawing Sheets

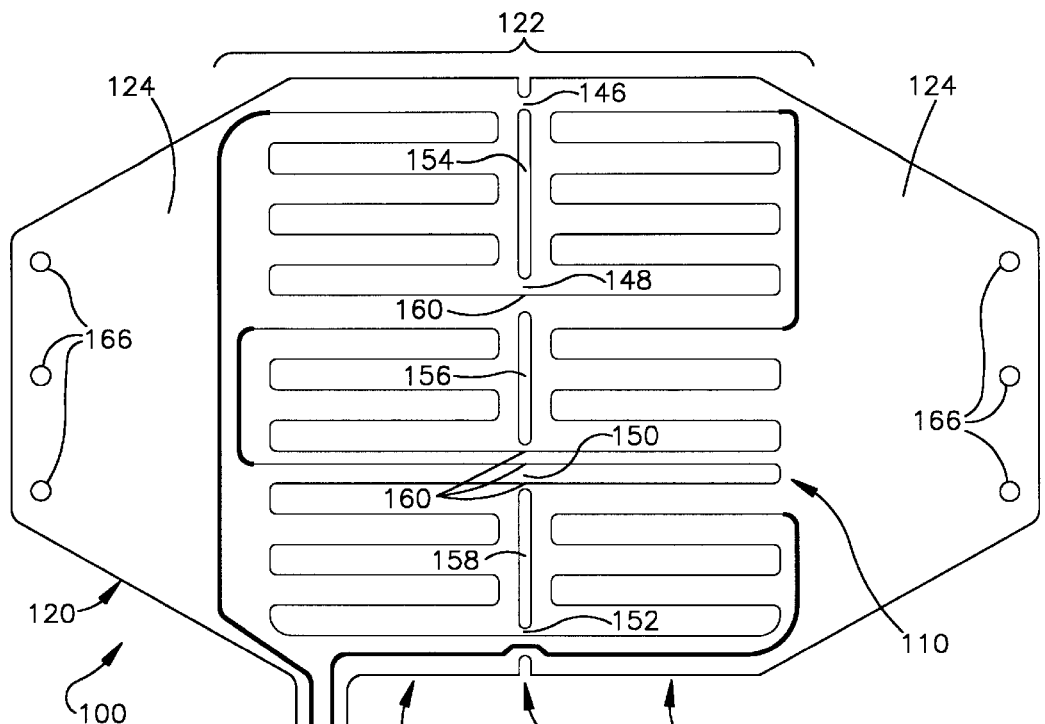
Fig.2
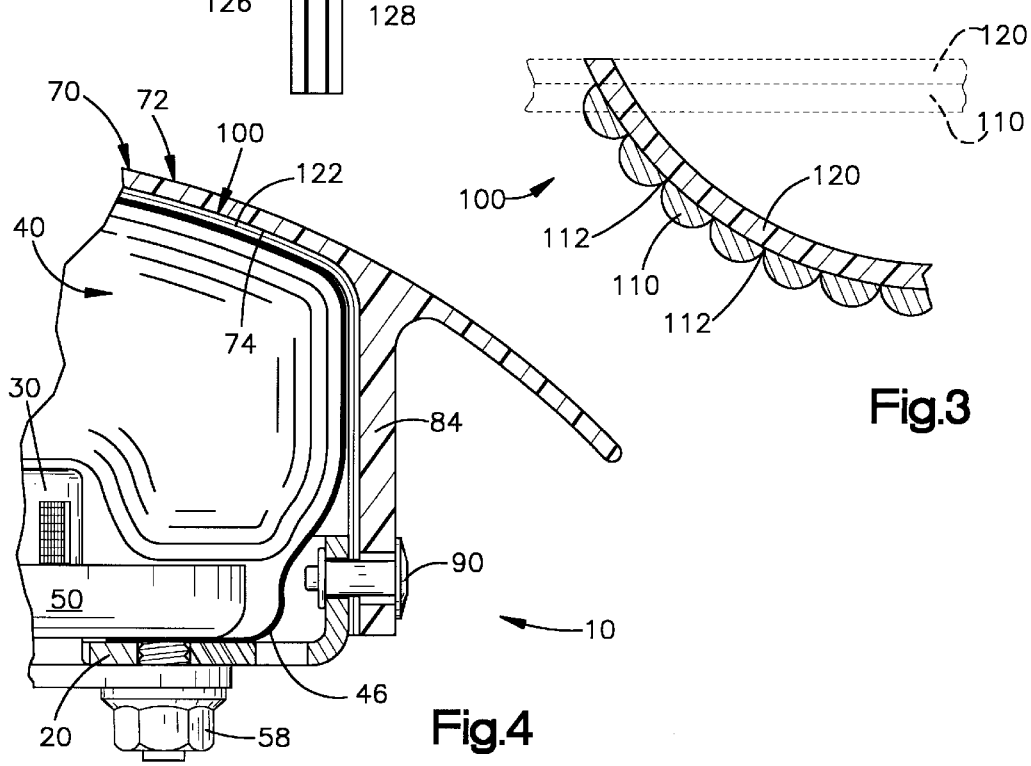
Fig.3
Fig.4

HORN SWITCH FOR AIR BAG MODULE

BACKGROUND OF THE INVENTION

1. Technical Field

The present invention relates to a switch for mounting on a portion of a vehicle as part of a vehicle safety apparatus. In particular, the present invention relates to a horn switch which is part of an air bag module mounted on a vehicle steering wheel.

2. Description of the Prior Art

It is known to mount an air bag module on a steering wheel of a vehicle to help protect the driver of the vehicle. The air bag module includes an air bag and an inflator. In the event of sudden vehicle deceleration of a magnitude which requires protection of the driver, the inflator is actuated to inflate the air bag into a position to help protect the driver of the vehicle.

It is known to provide a horn switch which is operable by pressing on a cover of an air bag module mounted on a vehicle steering wheel. U.S. Pat. No. 5,309,135 discloses a horn switch which includes a variable resistance conductor adhered to a flexible substrate which is in turn connected with an air bag module cover.

SUMMARY OF THE INVENTION

The present invention is a vehicle safety apparatus for helping to protect an occupant of a vehicle. The apparatus comprises an inflatable vehicle occupant protection device having a deflated condition and being inflatable into an inflated condition adjacent to a vehicle occupant. An inflator is actuatable to provide inflation fluid for inflating the inflatable device from the deflated condition to the inflated condition. Support means supports the inflator and the inflatable device on a portion of the vehicle. A cover covers the inflatable device and the inflator. A structure is disposed between the cover and the inflatable device and in an electric circuit for actuating an electrically actuatable device of the vehicle. The cover has a first portion engageable by the vehicle occupant to actuate the electrically actuatable device and a second portion for connecting the first portion with the support means. The first portion of the cover is movable, due to the force of inflation of the inflatable device, from a closed condition to an open condition to enable inflation of the inflatable device. The structure has an active portion underlying the first portion of the cover. The active portion of the structure comprises an electrically conductive material having an electrical resistance which is variable in response to force applied to the cover by a vehicle occupant to deform the cover. The structure has an inactive portion underlying the second portion of the cover. The apparatus comprises fastener means for connecting the inactive portion of the structure with the second portion of the cover.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 2 is a plan view of the switch of FIG. 1;

FIG. 3 is an enlarged schematic view showing parts of the horn switch of FIG. 1 in different positions; and FIG. 4 is a view of a portion of the module of FIG. 1, shown in an assembled condition;

DESCRIPTION OF PREFERRED EMBODIMENTS

Figure 1:
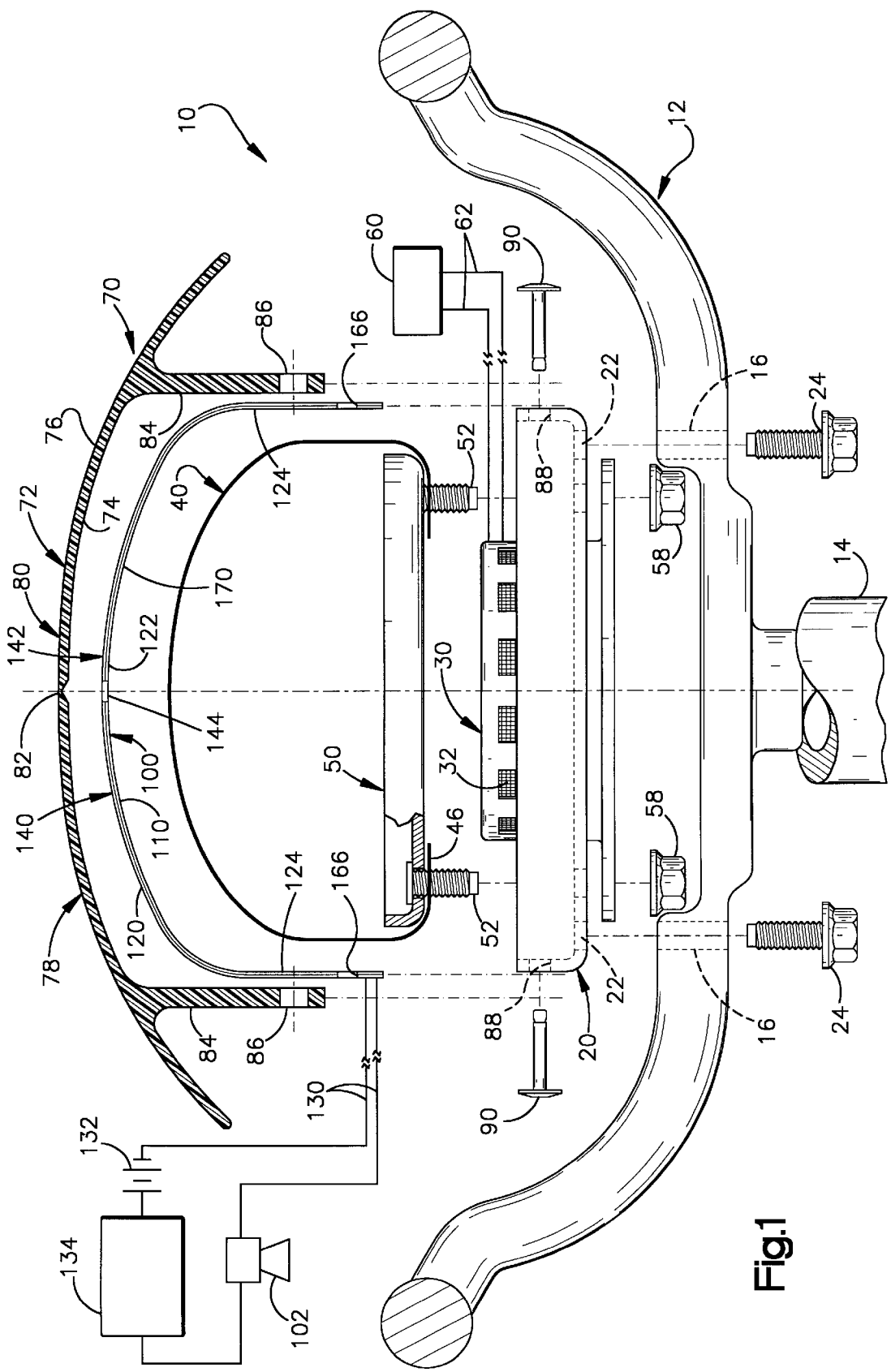
FIG. 1 is a schematic view, partially in section, showing a horn switch as part of an air bag module mounted on a vehicle steering wheel.

The present invention relates to a vehicle safety apparatus including a switch. In particular, the present invention relates to an air bag module which includes a switch for an electrically actuatable device of the vehicle, such as a vehicle horn. As representative of the present invention, FIG. 1 illustrates an air bag module 10.

The air bag module 10 is mounted on a vehicle steering wheel, a portion of which is shown at 12. The steering wheel 12 is supported on a steering shaft or steering column of the vehicle indicated schematically at 14. A plurality of fastener openings 16 are formed in the steering wheel 12.

The air bag module 10 includes a support or base plate 20 which is preferably made from steel or aluminum. A plurality of fastener openings 22 are spaced apart around the periphery of the base plate 20. A plurality of bolts 24 extend through the fastener openings 16 in the steering wheel 12 and are screwed into the fastener openings 22 in the base plate 20. The bolts 24 secure the base plate 20 to the steering wheel 12.

The air bag module 10 includes an inflator 30 which is supported in a known manner (not shown) on the base plate 20. The inflator 30 has one or more fluid outlets 32 for directing inflation fluid into an air bag 40 upon actuation of the inflator. The inflator 30 is illustrated as a pyrotechnic inflator which uses the combustion of gas-generating material to generate inflation fluid in the form of gas to inflate the air bag 40. The module 10 alternatively could include an inflator which contains a stored quantity of pressurized inflation fluid, or a combination of pressurized inflation fluid and ignitable material for heating the inflation fluid.

The air bag 40 is illustrated schematically in a deflated, packed condition in FIG. 1. The air bag 40 is preferably made from a fabric material such as woven nylon. The air bag 40 can alternatively be made from non-woven material, such as plastic film. The use of plastic film, in particular, would require inflation fluid vents to be formed in the air bag 40, as is known in the art.

The module 10 includes a retaining ring 50 from which extend a plurality of fasteners 52, such as weld studs. The fasteners 52 on the retaining ring 50 extend through openings in an end portion 46 of the air bag 40. The retaining ring 50 is secured to the base plate 20 by nuts 58 screwed onto the fasteners 52. The end portion 46 of the air bag 40 is clamped between the retaining ring 50 and the base plate 20. As a result, the air bag 40 is secured in position on the vehicle steering wheel 12, adjacent to the inflator 30.

The vehicle includes known means 60 for sensing a collision involving the vehicle and for actuating the inflator 30 in response to the sensing of a collision. The means 60 may include a deceleration sensor and vehicle electric circuitry for actuating the inflator 30 in response to sensing a vehicle deceleration indicative of a vehicle collision having a severity greater than a predetermined threshold value. As discussed below, the means 60 provides an electric signal over lead wires 62 to the inflator 30, when the inflator is to be actuated.

The air bag module 10 includes a cover 70 for enclosing the air bag 40 and the inflator 30. The cover 70 is made from a material which is strong enough to protect the parts of the air bag module 10 which are enclosed within the cover. The material of the cover 70 is sufficiently flexible or deformable so that it can be resiliently deformed inwardly (that is, in a downward direction as viewed in FIG. 1) by pressure from an occupant of the vehicle, so as to actuate an electrical device of the vehicle such as the vehicle horn.

The cover 70 has a main body portion 72 which has inner and outer side surfaces 74 and 76. The main body portion 72 of the cover 70 includes first and second cover parts 78 and 80 separated by an elongate tear seam 82 of the cover. The tear seam 82 constitutes a weakened portion of the cover 70 which is rupturable under the force of the inflating air bag 40 to enable the cover parts 78 and 80 to move away from each other so that the air bag can inflate out of the cover.

A mounting flange or mounting portion 84 of the cover 70 extends from the main body portion 72 in a direction toward the base plate 20. A plurality of first fastener openings 86 are formed in the mounting portion 84 of the cover 70.

The air bag module 10 includes a structure 100 for actuating an electrically actuatable device of the vehicle, such as a vehicle horn indicated schematically at 102. In the preferred embodiment, the structure 100 is a flexible, sheet material, single layer variable potentiometer switch which includes a layer of electrically conductive, variable resistance material 110 (FIG. 2) which is screen printed onto a substrate 120. The switch 100 is generally of the type shown in U.S. Pat. Nos. 5,157,372 and 5,309,135 and available from Flexpoint, Inc., 6906 South 300 West, Midvale, Utah 84047.

The substrate portion 120 of the switch 100 is an electrically insulating material which is tear resistant and die cuttable. The material of the substrate 120 is able to conform to compound curves and to retain the variable resistance material 110. A preferred material for the substrate 120 is Kapton (trademark) polyimide film which is available from E. I. DuPont de Nemours & Co. of Wilmington, Del. Other suitable materials include Mylar (trademark) film which is available from DuPont, and Melinex (trademark) polyester film which is available from Imperial Chemical Industries of London, England. The substrate 120 preferably has a thickness of about 1 mil.

The variable resistance material 110 is a material whose electrical conductivity varies when the material is deformed in one direction only. The preferred variable resistance material 110 is a graphite based ink which develops fissures or cracks (shown schematically at 112 in FIG. 3) when bent. The cracks 112, it is believed, increase the electrical resistance of the ink. The resistance of the variable resistance material 110 increases only when the switch 100 is bent or deformed by force exerted in a downward direction as viewed in FIG. 1. The resistance of the variable resistance material 110 does not increase when the switch 100 is bent or deformed by force exerted in an upward direction as viewed in FIG. 1.

The variable resistance material 110 (FIG. 2) covers only a portion of the substrate 120. Specifically, the switch 100 has an active portion 122 located between a pair of inactive portions 124. The active portion 122 of the switch 100 is that part of the switch which is exposed to force from the vehicle occupant pressing on the cover 70 of the air bag module 10 to operate the switch. In the active portion 122 of the switch 100, a layer of the variable resistance material 110 is deposited on the substrate 120. The variable resistance material 110 is deposited, preferably in a grid pattern as shown in FIG. 2, so as to form a variable resistance conductor between a pair of conductive traces 126 and 128. It should be understood that the variable resistance material 110 can be placed on the substrate in other patterns.

A pair of lead wires 130 (FIG. 1) or other known type of electrical conductor are electrically connected with the conductive traces 126 and 128 on the switch 100. The lead wires 130 connect the horn switch 100 with the vehicle horn 102, with a power source 132 such as the vehicle battery, and with vehicle electric circuitry indicated schematically at 134.

The switch 100 (FIG. 2) includes first and second switch parts 140 and 142 which are separated by an elongate tear seam or rupturable portion 144 of the switch. The tear seam includes a linear series of connector sections 146, 148, 150 and 152 separated by a series of elongate slots 154, 156 and 158. The connector sections 146–152 extend between and interconnect the first and second switch parts 140 and 142. The number, length, and spacing of the connector sections 146–152 and of the slots 154–158 may be varied to control the amount of force needed to rupture the rupturable portion 144 of the switch 100.

The rupturable portion 144 of the switch 100 forms a stress riser in the switch. Specifically, the rupturable portion 144 of the switch 100 is a predetermined weakened portion of the switch which is rupturable under less force than is needed to rupture other, surrounding, portions of the switch. This area of predetermined weakness, or stress riser, in the switch 100 results from the presence of the slots 154–158. As a result, upon inflation of the air bag 40, the switch 100 opens, in a predetermined manner, at the rupturable portion 144 rather than at any other location.

The two inner connector sections 148 and 150 of the switch 100 are active—that is, portions 160 of the electrically conductive, variable resistance material 110 are located on each one of the connector sections 148 and 150. As a result, when force is transmitted through the cover 70 to the connector sections 148 and 150, the resistance of the switch 100 varies. These two connector sections 148 and 150 are located at or near the center of the vehicle steering wheel 12 when the switch 100 is installed in the air bag module 10, so as to receive force when the vehicle occupant presses at or near the center of the cover 70 to sound the horn 102.

The switch 100 is disposed between the outside of the air bag 40 and the inside of the cover 70. A plurality of fastener openings 166 are formed in the inactive portions 124 of the switch 100. When the switch 100 is assembled on the module 10, the mounting portion 84 of the cover 70 overlies the inactive portions 124 of the switch 100. Rivets 90 extend through the fastener openings 86 in the mounting portion 84 of the cover 70 and through the fastener openings 166 in the inactive portions 124 of the switch 100. The inactive portions 124 of the switch 100 are clamped between the mounting portion 84 of the cover 70 and the base plate 20. The conductive material 110 in the active portion 122 of the switch 100 is on the inside of the switch, that is, facing the air bag 40. The elongate tear seam 82 of the cover 70 overlies and extends parallel to the elongate tear seam 144 of the switch 100.

In this condition, the switch 100 is "sandwiched" between the air bag 40 and the cover 70. The packed air bag 40 (FIG. 4) presses the active portion 122 of the switch 100 outward against the inner side surface 74 of the cover 70 to minimize any air gap between the switch and the cover. When the ignition switch of the vehicle is turned on, the vehicle electric circuitry 134 senses the electrical resistance of the switch 100 and sets this as a "baseline" level of resistance. Therefore, the force of the packed air bag 40, pressing the switch 100 outward against the cover 70, does not vary the resistance of the variable resistance material 110 so as to energize the vehicle horn 102.

To effect operation of the vehicle horn 102, the driver of the vehicle presses on the cover 70 of the air bag module 10 in a downward direction as viewed in FIG. 1. The force applied to the cover 70 of the air bag module 10 is transmitted through the cover to the switch 100.

The switch 100 deforms under the force transmitted through the cover 70. When the switch 100 deforms, the electrical resistance of the conductive material 110 increases. This change in the resistance of the switch 100 is sensed by the vehicle electric circuitry 134. The vehicle horn 102 is energized.

When the force on the cover 70 of the air bag module 10 is released, the resilience of the cover 70 causes it to move away from the air bag 40. As this movement occurs, the switch 100 returns to its original, undeformed condition. The electrical resistance of the conductive material 110 returns to its first level. This change in the resistance of the switch 100 is sensed by the vehicle electric circuitry 134. The vehicle horn 102 is de-energized.

In the event of an impact to the vehicle of a magnitude greater than the predetermined threshold value, the sensing means 60 provides an electrical signal over the wires 62 to the inflator 30. The inflator 30 is actuated in a known manner. Inflation fluid flows out of the inflator 30 through the fluid outlets 32 and into the air bag 40. The rapidly flowing inflation fluid causes the air bag 40 to inflate in an upward direction as viewed in FIG. 1.

The force of the inflating air bag 40 is applied against the inside of the switch 100. Specifically, the inflating air bag 40 pushes outward against an inner side surface 170 (FIG. 1) of the switch 100, on both the first switch part 140 and the second switch part 142.

The force of the inflating air bag 40 attempts to open the switch 100 to allow the air bag to inflate out of the switch. The switch 100 opens at the rupturable portion 144, which is the predetermined weakened portion of the switch. The connector sections 146–152 of the rupturable portion 144 break. The inactive portions 124 of the switch 100 act as hinges about which the first and second switch parts 140 and 142 move away from each other into an open condition (not shown).

The opening of the switch 100 enables the first and second switch parts 140 and 142 to move away from each other so that the air bag 40 can inflate out of the switch. The inactive portions 124 of the switch 100, which are clamped to the base plate 20 by the rivets 90, keep the switch parts 140 and 142 from moving away from the air bag module 10 into the interior of the vehicle.

The force of the inflating air bag 40 is also applied against the inside of the cover 70 through the switch 100. Specifically, the inflating air bag 40 transmits force through the switch 100 against the inner side surface 74 of the main body portion 72 of the cover 70, on both the first cover part 78 and the second cover part 80.

The force of the inflating air bag 40 attempts to open the cover 70 to allow the air bag to inflate out of the cover. The cover 70 opens at the rupturable portion 82, which is the predetermined weakened portion of the cover. The rupturable portion 82 breaks, and the first and second cover parts 78 and 80 move away from each other into an open condition (not shown). The cover 70 opens sufficiently that the air bag 40 inflates between the first and second cover parts 78 and 80 into a position to help protect the vehicle occupant.

The switch 100 can be used to actuate an electrically actuatable device of the vehicle other than the vehicle horn 102. For example, the switch 100 could be used to actuate or control the vehicle radio, speed control, etc. Alternatively, the switch 100 could have a plurality of electrically independent active areas for controlling a plurality of electrically actuatable devices including the vehicle horn 102.

Figure 5:
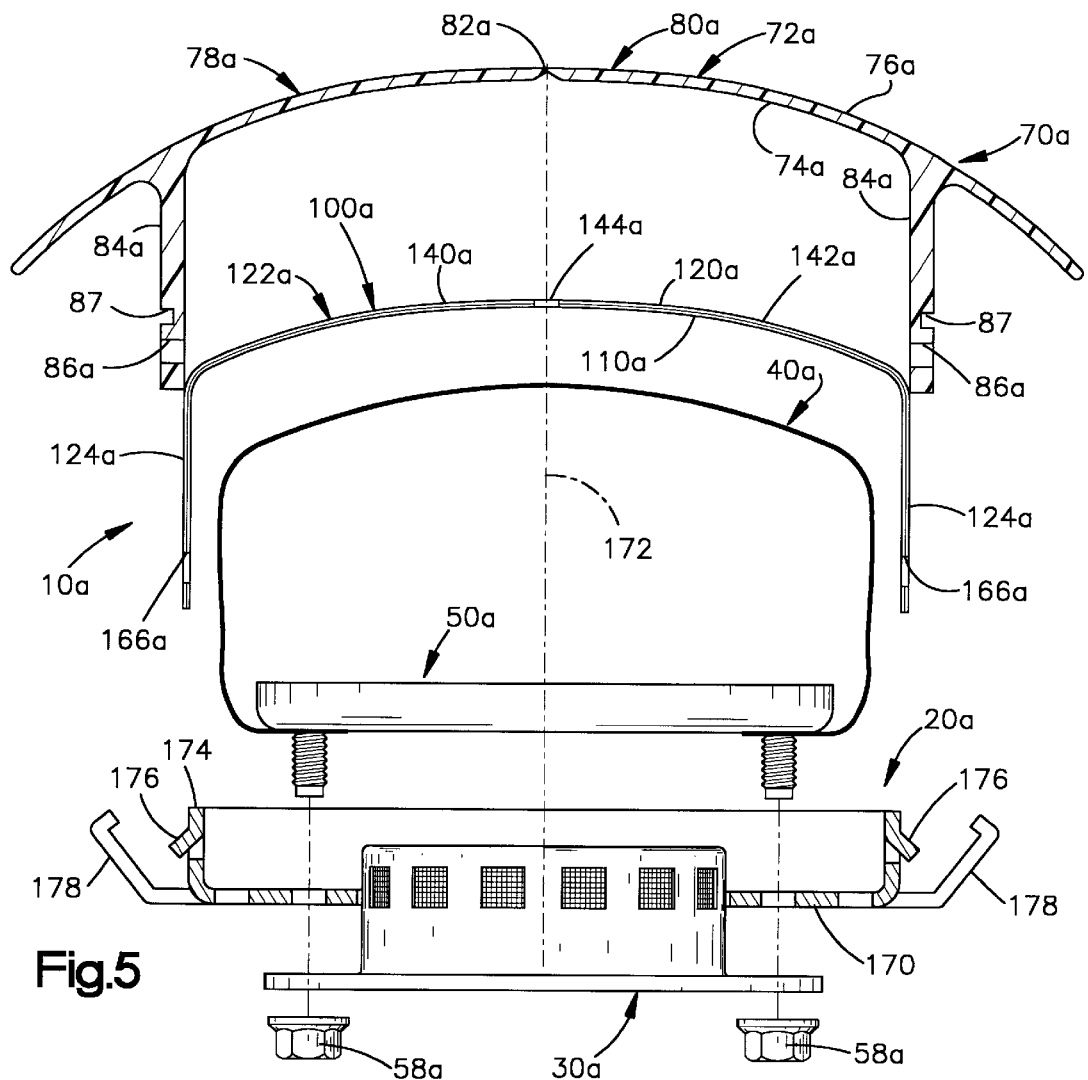
FIG. 5 is a view similar to FIG. 1 showing parts of an air bag module including a horn switch and constructed in accordance with a second embodiment of the present invention.
Figure 6:
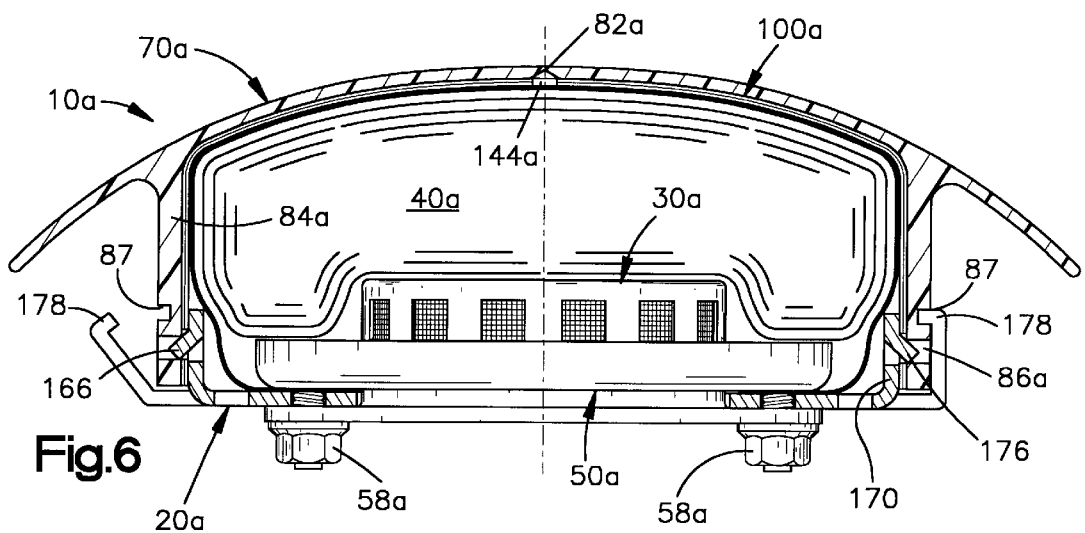
FIG. 6 is a view showing the module of FIG. 5 in a partially assembled condition.

FIGS. 5 and 6 illustrate an air bag module 10*a* which is constructed in accordance with a second embodiment of the present invention. The air bag module 10*a* is generally similar in construction and mode of operation to the air bag module 10. Parts of the air bag module 10*a* which are similar or identical to parts of the air bag module 10 are given the same reference numeral with the suffix "a" added for clarity.

The base plate 20*a* (FIG. 5) of the air bag module 10*a* includes a main body portion 170 which extends radially relative to an axis 172 of the module 10*a*. An outer flange portion 174 of the base plate 20*a* extends axially from the main body portion 170, in a direction toward the cover 70. A plurality of locking tabs 176 are formed in the base plate 20*a*. The locking tabs 176 extend radially outward from the outer flange portion 174 in a direction away from the inflator 30*a* and the retaining ring 50*a*.

The base plate 20*a* also includes a plurality of locking arms 178 which extend radially outward from the outer flange portion 174 of the base plate 20*a*. The locking arms 178 are pivotable between an open position, spaced apart from the locking tabs 176 on the outer flange portion 174, as shown in FIG. 5, and a closed position as shown at the right side of FIG. 6. When in the closed position, the locking arms 178 are disposed adjacent to the locking tabs 176 on the outer flange portion 174 of the base plate 20*a*. The locking arms 178, which are designed to be moved from the open position to the closed position only once, may be made as one piece with the other portions of the base plate 20*a*.

After the air bag 40*a*, the retaining ring 50*a*, and the inflator 30*a* are assembled to the base plate 20*a*, the switch 100*a* is connected with the base plate. The base plate 20*a* is initially in a condition as shown in FIG. 5 in which the locking arms 178 are in the open position. The switch 100*a* is moved in a downward direction as viewed in FIGS. 5 and 6, to a position with the inactive portions 124*a* outside the outer flange portion 174 of the base plate 20*a*. The locking tabs 176 on the base plate 20*a* are received in the fastener openings 166 in the switch 100.

The cover 70 is next moved in a downward direction as viewed in FIGS. 5 and 6, to a position with the mounting portions 84*a* overlying the inactive portions 124 of the switch 100*a* and the outer flange portion 174 of the base plate 20*a*. The locking tabs 176 on the base plate 20*a* are received in first fastener openings 86*a* in the cover. The locking arms 178 are then permanently deformed inward, from the open condition to the closed condition as shown on the right side of FIG. 6. The locking arms 178 are received in second fastener openings 87 in the cover 70*a*. The locking arms 178 cooperate with the locking tabs 176 to secure the switch 100*a* and the cover 70*a* to the base plate 20*a*.

Once the switch 100a is assembled in the air bag module 10a, the switch functions in the same manner as the switch 100 of the air bag module 10. Specifically, the switch 100a is actuated in the same manner as the switch 100 of the air bag module 10. The air bag 40a is inflatable through the tear seam 144a of the switch 100a in the same manner as the air bag 40 is inflatable through the tear seam 144 of the switch 100.

Figure 7:
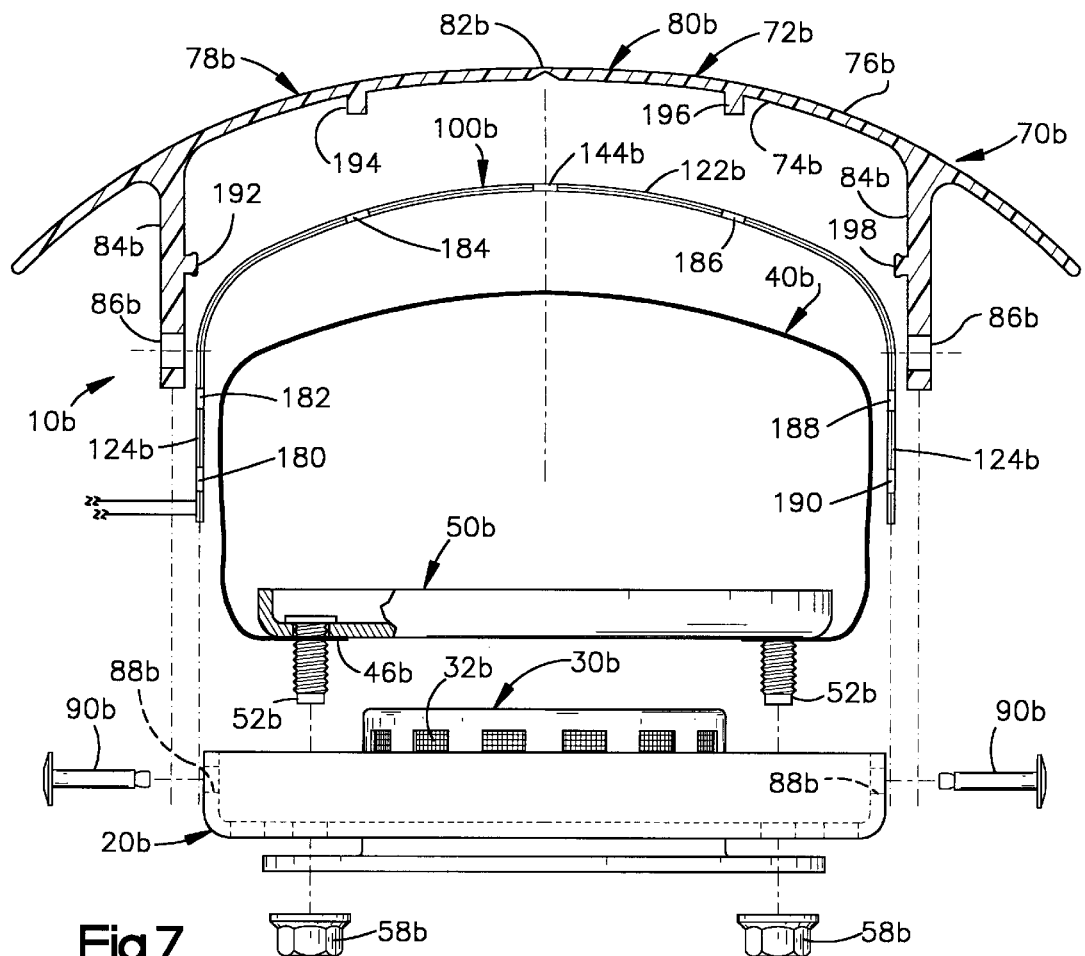
FIG. 7 is a view similar to FIG. 1 showing parts of an air bag module including a horn switch and constructed in accordance with a third embodiment of the present invention.
Figure 8:
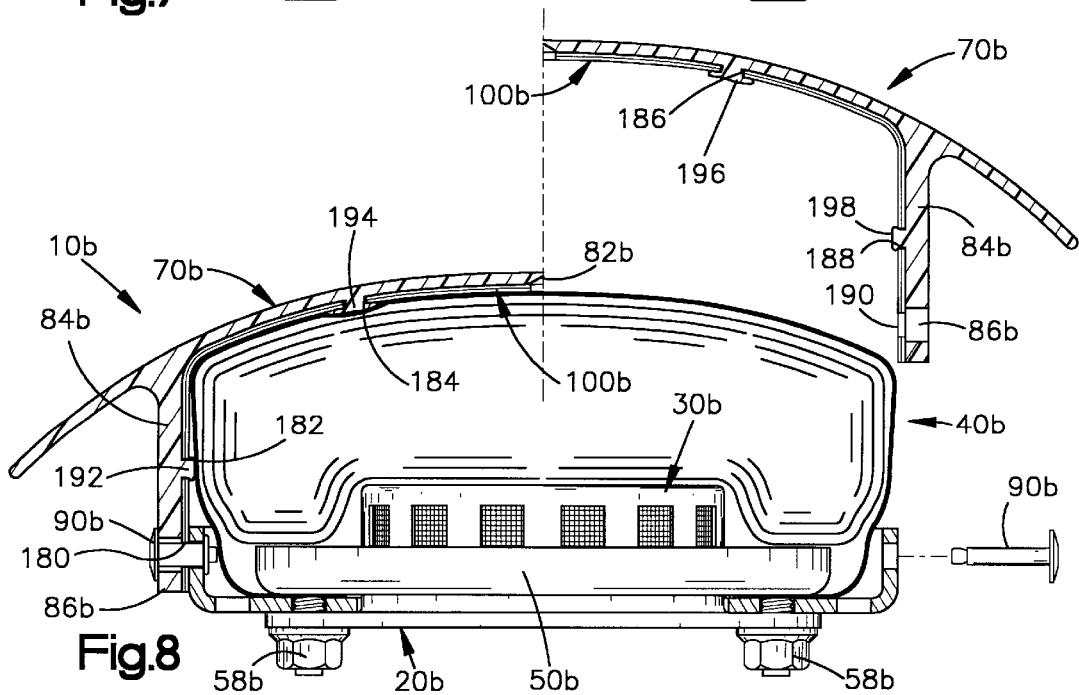
FIG. 8 is a view showing the module of FIG. 7 in a partially assembled condition.

FIGS. 7 and 8 illustrate portions of an air bag module 10b which is constructed in accordance with a third embodiment of the present invention. The air bag module 10b is generally similar in construction and mode of operation to the air bag module 10. Parts of the air bag module 10b which are similar or identical to parts of the air bag module 10 are given the same reference numeral with the suffix "b" added for clarity.

A plurality of fastener openings are formed in the switch 100b, spaced apart in an array extending over substantially the entire switch. The fastener openings include the openings 180, 182, 184, 186, 188 and 190 shown in FIG. 7. The openings 180, 182, 188 and 190 are located in the inactive portions 124a of the switch. The openings 184 and 186 are located in the active portion 122b of the switch 100a.

A plurality of fasteners are formed on the cover 70b, in the form of pins spaced apart in an array extending over substantially the entire cover. The fasteners include the pins 192, 194, 196 and 198 shown in FIG. 7 which are formed on the inner side surface 74b of the cover 70b. The pins 192 and 198 are located on the mounting portion 84b of the cover 70b. The pins 194 and 196 are located on the main body portion 72b of the cover 70b.

The switch 100b is connected with the cover 70b, before the cover is connected to the base plate 20b. The switch 100b is positioned against the inner side surface 74b of the cover 70b. The main body portion 72b of the cover 70b overlies the active portion 122b of the switch. The mounting portion 84b of the cover 70b overlies the inactive portions 124b of the switch 100b.

The pin 192 extends through the opening 182 in the switch 100b. The pin 192 has an interference fit in the opening 182 in the switch 100b. The pin 198 extends through the opening 188 in the switch 100b. The pin 198 has an interference fit in the opening 188. The inactive portions 124b of the cover 70b are thus held in position inside the mounting portion 84b of the cover.

The pins 194 and 196 extend through the openings 184 and 186, respectively, in the switch 100b. The pins 194 and 196 are heat staked to deform their ends to a condition larger than the associated fastener openings in the switch 100b. The active portion 122b of the switch 100b is thus held in position inside the main body portion 72b of the cover 70b.

Alternatively, all of the pins on the cover 70b can have an interference fit with their respective openings in the switch 100b; or, all of the pins on the cover can be staked to secure the switch to the cover.

The switch 100b is disposed outside of the air bag 40b and inside of the cover 70b. When the switch 100b and the cover 70b are assembled to the base plate 20b, the rivets 90b extend through the openings 86b in the cover 70b and through the openings 180 and 190 in the switch 100b. The inactive portions 124b of the switch are clamped between the mounting portion 84b of the cover 70b and the base plate 20b.

Once the switch 100b is assembled in the air bag module 10b, the switch functions in the same manner as the switch 100 of the air bag module 10. Specifically, the switch 100b is actuated in the same manner as the switch 100 of the air bag module 10. The air bag 40b is inflatable through the tear seam 144b of the switch 100b in the same manner as the air bag 40 is inflatable through the tear seam 144 of the switch 100.

From the above description of the invention, those skilled in the art will perceive improvements, changes and modifications. For example, the present invention is not limited to an air bag module which is mounted on a vehicle steering wheel. The present invention can be used with an air bag module mounted on a vehicle instrument panel, a vehicle seat or door panel, or other portion of the vehicle. Also, the inner surface of the cover may have ribs or other projections for concentrating the force applied by the vehicle occupant to effect a sharper or more distinct bending of the conductive material of the switch. Such improvements, changes and modifications within the skill of the art are intended to be covered by the appended claims.

Having described the invention, I claim:

1. A vehicle safety apparatus for helping to protect an occupant of a vehicle, said apparatus comprising:

an inflatable vehicle occupant protection device having a deflated condition and being inflatable into an inflated condition adjacent to a vehicle occupant;

an inflator actuatable to provide inflation fluid for inflating said inflatable device from the deflated condition to the inflated condition;

support means for supporting said inflator and said inflatable device on a portion of the vehicle;

a cover covering said inflatable device and said inflator;

a structure disposed between said cover and said inflatable device and in an electric circuit for actuating an electrically actuatable device of the vehicle;

said cover having a first portion engageable by the vehicle occupant to actuate the electrically actuatable device and a second portion for connecting said first portion with said support means, said first portion of said cover being movable, due to the force of inflation of said inflatable device, from a closed condition to an open condition to enable inflation of said inflatable device;

said structure having an active portion underlying said first portion of said cover, said active portion of said structure comprising an electrically conductive material having an electrical resistance which is variable in response to force applied to said cover by a vehicle occupant to deform said cover;

said structure having an inactive portion underlying said second portion of said cover; and said apparatus comprising fastener means for connecting said inactive portion of said structure with said second portion of said cover.

2. An apparatus as set forth in claim 1 wherein said inactive portion of said structure has a plurality of fastener openings, said second portion of said cover having a plurality of fastener openings, said fastener means comprising a plurality of fasteners extending through said fastener openings in said cover and through said fastener openings in said inactive portion of said structure and into said support means.

3. An apparatus as set forth in claim 2 wherein said fasteners are rivets.

4. An apparatus as set forth in claim 1 wherein said active portion of said structure includes a tear seam which comprises variable resistance material on a rupturable connector section of said structure, said first portion of said cover including a tear seam which overlies said tear seam in said active portion of said structure.

5. An apparatus as set forth in claim 1 wherein said first portion of said cover comprises first and second cover parts releasably interconnected by a rupturable portion of said cover;

said cover having a closed condition in which said first and second cover parts enclose said inflatable device when said inflatable device is in the deflated condition;

said cover being movable, due to the force of inflation of said inflatable device, from the closed condition to an open condition in which said rupturable portion of said cover is ruptured and said first and second cover parts are spaced apart from each other to enable inflation of said inflatable device; and said active portion of said structure comprising a first part movable with said first cover part from the closed condition to the open condition and a second part movable with said second cover part from the closed condition to the open condition.

6. An apparatus as set forth in claim 1 wherein said air bag when in the deflated condition has an outer side surface which is in abutting engagement with an inner side surface of said structure, said structure having an outer side surface which is in abutting engagement with an inner side surface of said cover.

7. An apparatus as set forth in claim 1 wherein said inactive portion of said structure has a plurality of first fastener openings, said fastener means comprising a plurality of projections on said support means, said projections being received in said first fastener openings in said structure to resist movement of said structure relative to said support means.

8. An apparatus as set fourth in claim 6 wherein the force of said deflated air bag against said structure does not vary the resistance of said electrically conductive material to energize the electrically actuatable device.

9. An apparatus as set forth in claim 1 wherein said structure has a plurality of fastener openings, said fastener means comprising a plurality of pins on said cover, said pins on said cover extending through said fastener openings in said structure to secure said structure to said cover.

10. An apparatus as set forth in claim 9 wherein at least one of said pins on said cover has an interference fit in one of said plurality of fastener openings in said structure.

11. An apparatus as set forth in claim 10 wherein said at least one of said pins on said cover is disposed on said second portion of said cover.

12. An apparatus as set forth in claim 9 wherein at least one of said pins has an end portion which is deformed to connect said structure with said cover.

13. An apparatus as set forth in claim 12 wherein said at least one of said pins on said cover connects said first portion of said structure for movement with said first portion of said cover between the closed condition and the open condition.

14. A vehicle safety apparatus for helping to protect an occupant of a vehicle, said apparatus comprising:

an inflatable vehicle occupant protection device having a deflated condition and being inflatable into an inflated condition adjacent to a vehicle occupant;

support means for supporting said inflator and said inflatable device on a portion of the vehicle;

a cover covering said inflatable device and said inflator;

a structure disposed between said cover and said inflatable device and in an electric circuit for actuating an electrically actuatable device of the vehicle;

said cover having a first portion engageable by the vehicle occupant to actuate the electrically actuatable device and a second portion for connecting said first portion with said support means, said first portion of said cover being movable, due to the force of inflation of said inflatable device, from a closed condition to an open condition to enable inflation of said inflatable device;

said structure having an active portion underlying said first portion of said cover, said active portion of said structure comprising an electrically conductive material having an electrical resistance which is variable in response to force applied to said cover by a vehicle occupant to deform said cover;

said structure having an inactive portion underlying said second portion of said cover; and said apparatus comprising fastener means for connecting said inactive portion of said structure with aid second portion of said cover;

said inactive portion of said structure having a plurality of first fastener openings, said fastener means comprising a plurality of projections on said support means, said projections being received in said first fastener openings in said structure to resist movement of said structure relative to said support means;

said support means including a plurality of movable arms received in second fastener openings in said second portion of said cover to secure said cover to said support means, said second portion of said cover clamping said inactive portion of said structure to said support means.

15. An apparatus as set forth in claim 14 wherein said movable arms are movable during assembly of said apparatus from an open condition spaced apart from said cover to a closed condition in said second fastener openings in said cover to clamp said inactive portion of said structure between said cover and said support means.

* * * * *